Sept. 3, 1940.  W. T. DOWNS  2,213,364
AUTOMOBILE BODY HEATER
Filed April 26, 1937   2 Sheets-Sheet 1
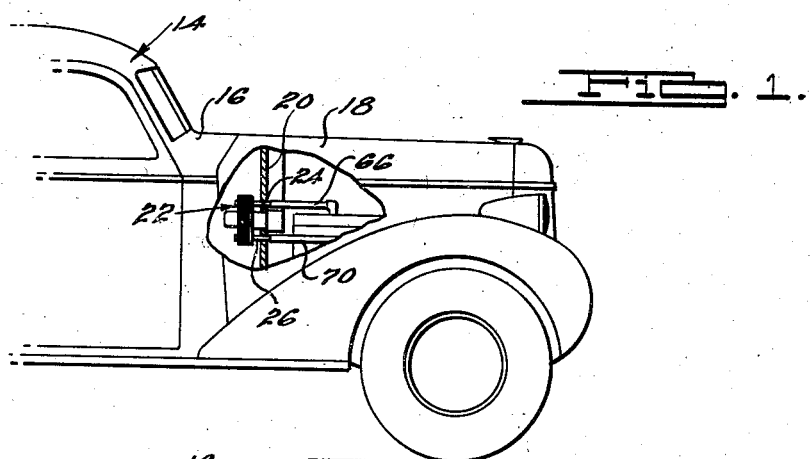
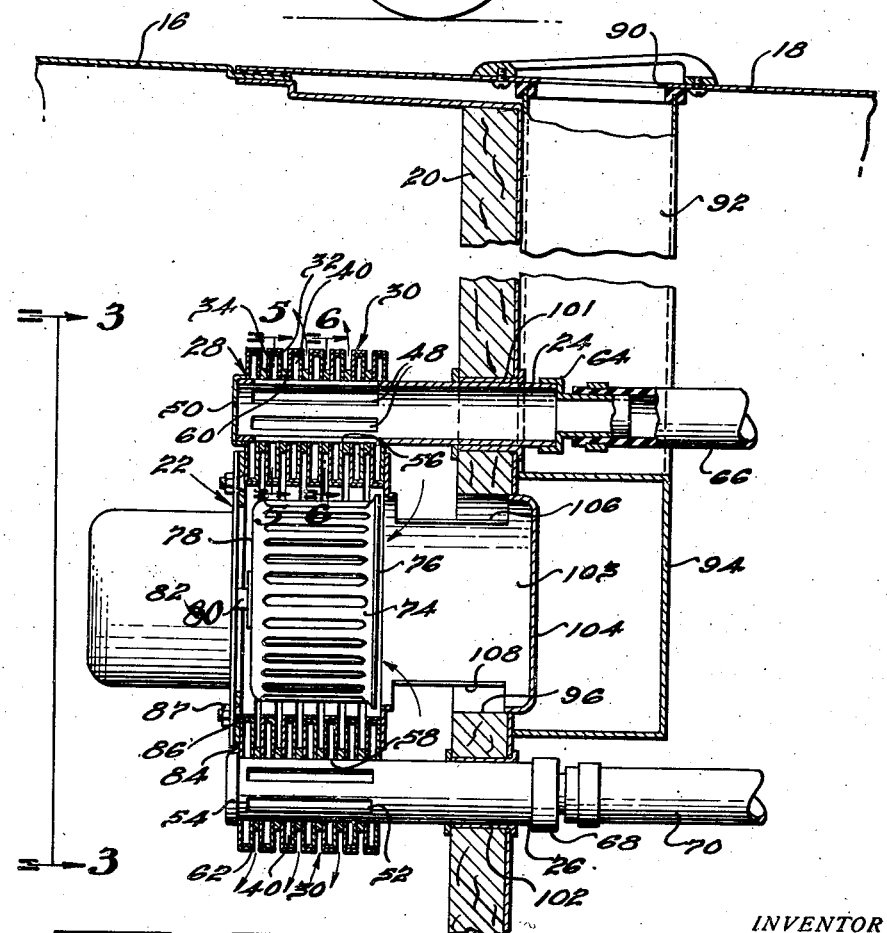
INVENTOR
William T. Downs.
BY
Harness, Dickey & Pierce.
ATTORNEYS.

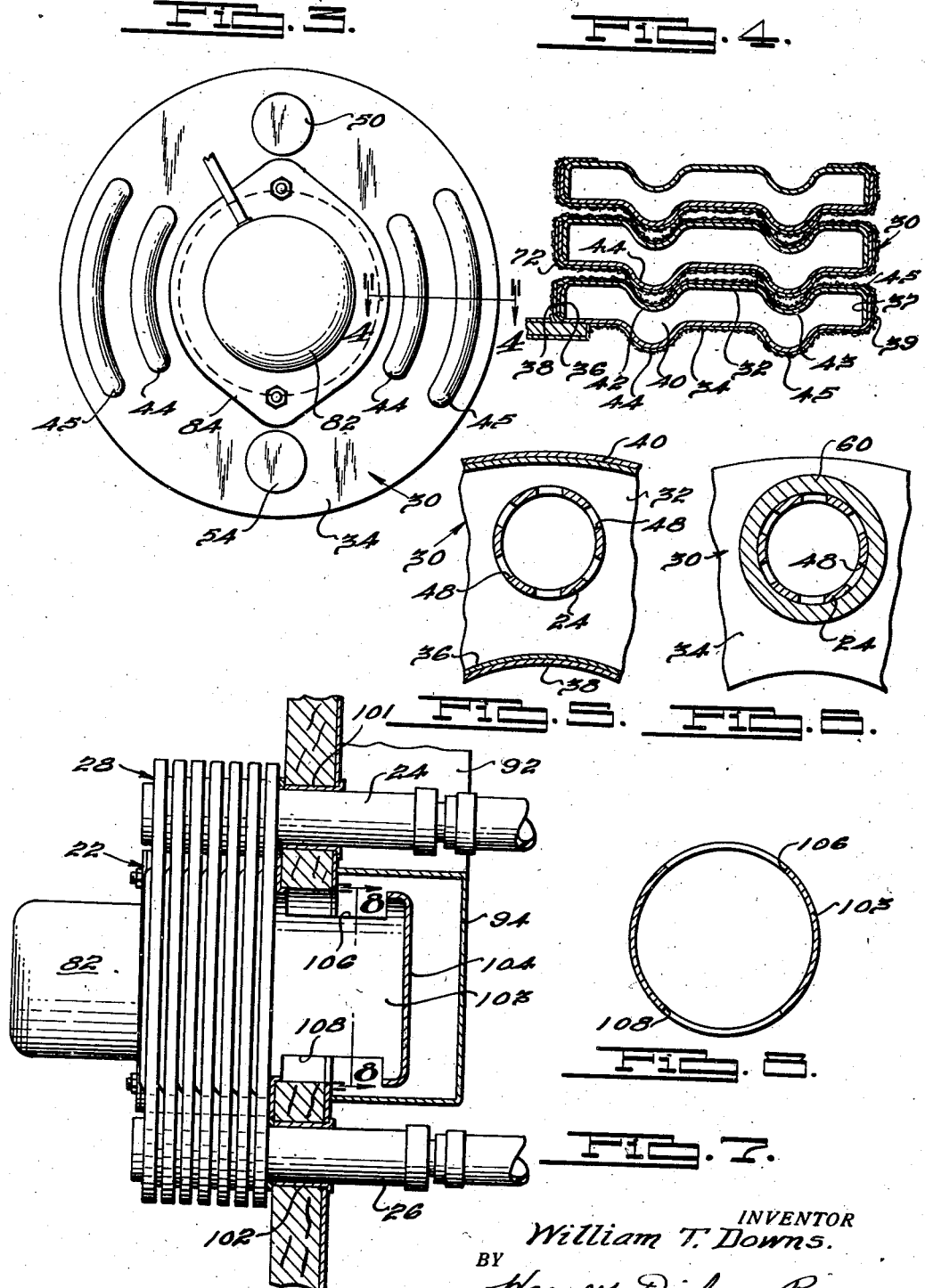

Patented Sept. 3, 1940

2,213,364

UNITED STATES PATENT OFFICE 2,213,364

AUTOMOBILE BODY HEATER

William T. Downs, Detroit, Mich., assignor to Evans Products Company, Detroit, Mich., a corporation of Delaware Application April 26, 1937, Serial No. 138,903

5 Claims. (Cl. 257—137)

This invention relates to vehicle body ventilating and heating structure and particularly relates to that type of structure in which an automobile body heater is mounted within the passenger compartment of a vehicle.

Objects of the present invention are to provide an automobile body heater having an air inlet conduit associated therewith adjustably mounted adjacent a fresh air inlet passage so that the position of the heater may be adjusted for passing fresh air only through the heater, or passing recirculated air only through the heater, or passing both recirculated and fresh air through the heater; to provide a heater of novel construction which is light in weight and which takes up a minimum of room within the passenger compartment of the vehicle; to provide a novel manner for adjustably mounting the heater on the dashboard of a vehicle; to provide a novel heater having a substantially circular heating core with radial air discharge passages formed by the core around the circumference thereof, and to provide a novel mounting for such type of core under the front seat of the vehicle so that the heated air is discharged from the heater into both the front and rear passenger compartments; to provide a heating core of novel construction having a roughened surface which provides for efficient dissipation of heat from the heater; and to provide a heater structure which is simple in construction and economical to manufacture.

Other objects of the present invention will become apparent from the following specification, the drawings relating thereto, and from the claims hereinafter set forth.

In the drawings in which like numerals are used to designate like parts in the several views throughout:

Figure 1 is a fragmentary side elevational view of a vehicle having associated therewith ventilating and heating structures embodying features of the present invention;

Fig. 2 is an enlarged vertical cross-sectional view of the structure illustrated in Fig. 1;

Fig. 3 is an elevational view taken substantially along the line 3—3 of Fig. 2;

Fig. 4 is a partial cross-sectional view taken substantially along the line 4—4 of Fig. 3;

Fig. 5 is a partial cross-sectional view taken substantially along the line 5—5 of Fig. 2;

Fig. 6 is a partial cross-sectional view taken substantially along the line 6—6 of Fig. 2;

Fig. 7 is a view similar to Fig. 2 illustrating the structure in a different position in accordance with the present invention; and, Fig. 8 is a cross-sectional view taken substantially along the line 8—8 of Fig. 7.

Referring to the drawings, and referring particularly to Figs. 1 to 8, an automobile 14 is illustrated having a cowl 16, a hood 18, and a dashboard 20 which separates the engine and passenger compartments. A heater assembly 22 is mounted on the dash 20 within the passenger compartment of the automobile and has inlet and outlet tubes 24 and 26, respectively, connected in the usual way to the engine cooling system for carrying the heated cooling medium to and from the heater.

The heater assembly 22 includes a substantially circular heating core 28 which is formed of a plurality of ring shaped hollow members 30. Each of the ring shaped members 30 is formed of two complementary ring members 32 and 34. The ring member 32 is provided with an inner annular flange 36 and an outer annular flange 37 extending in one direction; and the ring member 34 is provided with a complementary inner annular flange 38 and an outer annular flange 39 extending in the opposite direction. When the ring sections 32 and 34 are assembled a hollow ring shaped member 30 is provided in which the annular flange 36 is telescopically received within the annular flange 38 and the annular flange 37 is received within the annular flange 39 thus providing an annular chamber 40 through which the heating medium circulates. The flanges 36 and 38 and 37 and 39 are, of course, properly sealed so that the heating medium flowing through the circulating chamber 40 does not escape.

Complementary portions 42 and 44 and 43 and 45 are provided on the members 32 and 34, respectively, to provide air baffles for a portion of the distance around the circumference of the members 30.

The inlet tube 24 is preferably substantially circular in cross-section and is provided with elongated discharge openings 48 through the outer surface thereof, spaced around the periphery of the tube. The tube 24 is suitably closed and sealed adjacent its discharge end by means of a cap member 50 which is telescopically received over the end of the tube 24 and suitably sealed thereto. The return tube 26 is provided with similar elongated openings 52 therethrough, and its one end is sealed in a similar manner by a cap 54.

Diametrically opposed openings 56 and 58 are provided through the ring shaped hollow members 30 and the core 28 is thus formed by aligning the corresponding openings 56 and 58 of the members 30 and extending the tubes 24 and 26 through their respective openings in sealed engagement therewith. In order to space the members 30 from each other so as to provide radially extending air discharge passages between the members 30, solid ring members 60 and 62 are interposed between the hollow members 30 in embracing relation to the tubes 24 and 26, respectively. The members 30 and the ring members 60 and 62 are so arranged relative to the openings 48 and 52 in the tubes 24 and 26, respectively, that those portions of the openings 48 and 52 adjacent the rings 60 and 62, respectively, are shut off while the remaining portions of the openings communicate the circulating chambers 40 with the interiors of the tubes 24 and 26.

The inlet end of the pipe 24 telescopically receives thereover a coupling member 64 to which an elongated flexible member 66 is connected which extends to and communicates with the engine cooling system in the usual way. A similar coupling member 68 is received over the outlet end of the return tube 26 and has connected thereto a flexible conduit 70 which returns and communicates with the engine cooling system in the usual way.

In the structure so far described the heating medium enters through the tube 24 and is discharged therefrom radially outwardly through the openings 48 into the chambers 40 adjacent the top of the core. The heating medium then circulates through the chambers 40 and is discharged through the openings 52 in the return pipe 26 and is then returned to the engine cooling system in the usual way.

The radial surfaces of the members 30 are of sufficient width as to provide an efficient heat transverse surface, and the members 30 are so spaced relative to each other as to provide radially extending air discharge passages around the circumference of the core. The outwardly extending portions 44 and 45 nest within the inwardly extending portions 42 and 43 in spaced relation thereto when the members 30 are in their assembled position so as to effect baffling of the air over a portion of the core surface as the air is discharged radially outwardly from the heater.

In order to increase the heating effect of the core the surfaces of the members 30 are roughened, and an efficient and novel manner of doing this has been found by suitably securing metal shavings indicated at 72 over the outer surfaces of the members 30. These metal shavings may be secured to the surfaces in any manner and soldering has been found to be an efficient manner of accomplishing this.

In order to force air past the heater in heat exchange relation with the core and discharge the heated air into the passenger compartment of the vehicle, a centrifugal fan 74, of the sirocco type, is mounted completely within the core with the open inlet face 76 of the fan mounted adjacent one face of the core. The rear closed face 78 of the fan preferably lies in a plane substantially adjacent the plane of the other face of the core, and has fixed thereto substantially at its center a shaft 80 which is connected to and driven by a suitable motor 82. For mounting the motor 82 to the core, a mounting plate 84 may be suitably secured to the face of one of the end members 30. The motor 82 may be suitably secured to the supporting plate 84 by means of bolts 86 and nuts 87.

In the structure illustrated in Figs. 1 to 8 an opening 90 is provided through the hood 18 communicating with the exterior of the vehicle, and a downwardly extending fresh air inlet conduit 92 is mounted forwardly of the dash 20 and has a sidewardly extending substantially horizontal portion 94 which is in communication with an opening 96 through the dashboard 20. Although in the present application the communication with the exterior of the vehicle is shown as being through the hood 18, it is to be understood that such a communication could be in other parts of the vehicle within the scope of the present invention.

For adjustably mounting the heater assembly 22 relative to the dashboard 20, the inlet and outlet tubes 24 and 26 respectively extend through openings in the dash and are embraced by tubular bearing members 101 and 102 which are fixedly mounted within the openings in the dash. Thus the heater assembly 22 is supported by the tubes 24 and 26 and may be adjusted toward and from the dash 20 by sliding the tubes within the bearings 101 and 102.

To provide an air inlet conduit for the heater a tubular member 103 having a closed end 104 and having longitudinal inlet openings 106 and 108 therethrough is mounted on the face of the heating core toward the dash in alignment with the axis of the centrifugal fan 74 and adjacent the inlet face of the fan.

The closed end 104 is slidably received through the opening 96 in the dash, and in Fig. 2 the heater is illustrated as positioned so that the closed end 104 of the inlet conduit 103 closes the opening 96 and recirculated air enters the conduit 103 from within the passenger compartment through the openings 106 and 108 into the inlet face 76 of the fan 74. The air is then discharged radially outwardly through the passages formed by the core into the passenger compartment.

Referring to Fig. 7 the heater is illustrated as being in its innermost position so that the closed end 104 of the inlet conduit 103 extends within the fresh air inlet passage formed by the member 94, and the fresh air entering through the inlet openings 90 passes through the inlets 106 and 108 and is discharged through the fan into the passenger compartment in a heated condition. When in the position shown in Fig. 7 all of the air discharged into the passenger compartment is freshly heated air.

This invention contemplates intermediate positions of the heater relative to the dash in order to proportion the amount of recirculated and fresh air passed through the heater.

Formal changes may be made in the specific embodiments of the invention described without departing from the spirit and substance of the broad invention, the scope of which is commensurate with the appended claims.

What is claimed is:

1. Vehicle body ventilating and heating structure comprising means forming an air inlet passage communicating with the exterior of said vehicle, a heater and fan unit mounted within said body adjacent said passage, means forming an air inlet conduit connected to said heater and associated with said passage, said inlet conduit having an inlet opening for communicating with the interior of the body and with said inlet passage, and means adjustably mounting said air inlet conduit relative to said passage whereby the extent to which said inlet opening communicates with said passage may be adjustably controlled.

2. Vehicle body ventilating and heating structure comprising a first air inlet conduit having an inlet opening communicating with the exterior of said vehicle and having an outlet opening, a heater and fan unit mounted within said body adjacent said outlet opening, means forming a second inlet conduit connected to said heater and associated with said outlet opening of said first conduit, said second inlet conduit having elongated inlet openings formed through the wall thereof adapted to communicate with the interior of the body and with said first inlet conduit, and means adjustably mounting said first and second air inlet conduits relative to each other whereby the extent to which said elongated inlet openings communicate with said first conduit may be adjustably varied.

3. Vehicle body ventilating and heating structure comprising means forming an air inlet passage communicating with the exterior of the vehicle, a heater and fan unit mounted within said vehicle adjacent said passage, means forming an air inlet conduit connected to said heater and associated with said passage, and means adjustably mounting said air inlet conduit relative to said passage, the construction and arrangement of said air inlet conduit being such that air may be drawn into said conduit from the interior of the vehicle body or may be drawn into said conduit from said passage, or may be simultaneously drawn into said conduit from the interior of said vehicle body and said passage upon adjustment of said air inlet conduit relative to said passage.

4. Vehicle body ventilating and heating structure comprising a vehicle body having a dashboard, said dashboard having an opening therethrough, means forming an air inlet passage communicating said opening with the exterior of the vehicle, a heater and fan unit mounted within said vehicle adjacent said passage, said heater including a core having inlet and outlet tubes carrying a heating medium to and from said core, said tubes extending through said dashboard and supporting said heater and fan unit, bearing members embracing said tubes and slidably mounting said tubes relative to said dashboard, whereby said heater is slidably mounted relative to said dashboard, means forming an air inlet conduit connected to said heater for movement therewith and associated with the opening through said dashboard for adjustable movement therethrough.

5. An automobile body heater comprising a substantially circular heating core, said core including ring shaped hollow members providing annular passages for the flow of a heated medium therethrough, the outer surfaces of said members having metal shavings secured thereto to provide roughened outer surfaces, inlet and outlet tubes connected to the engine cooling system and conducting heating medium to and from the core, said tubes extending through said ring shaped members and having openings communicating the interiors of the tubes with the interiors of the ring shaped members, the construction and arrangement of said members relative to each other and to said tubes being such as to provide radial air passages, and means to pass air through said heater and through said air passages in heat exchange relation with said members.

WILLIAM T. DOWNS.